US009409538B2

(12) United States Patent
Gorman et al.

(10) Patent No.: US 9,409,538 B2
(45) Date of Patent: Aug. 9, 2016

(54) INTEGRATED AIRBAG AND HVAC ASSEMBLY

(71) Applicant: GM GLOBAL TECHNOLOGY OPERATIONS LLC, Detroit, MI (US)

(72) Inventors: David J. Gorman, Troy, MI (US); Richard J. Lannen, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 14/143,206

(22) Filed: Dec. 30, 2013

(65) Prior Publication Data

US 2015/0183390 A1    Jul. 2, 2015

(51) Int. Cl.
   B60R 21/20    (2011.01)
   B60H 1/00    (2006.01)
   B60R 21/205    (2011.01)

(52) U.S. Cl.
   CPC ............ *B60R 21/20* (2013.01); *B60H 1/00271* (2013.01); *B60H 1/00592* (2013.01); *B60R 21/205* (2013.01); *B60H 2001/00214* (2013.01)

(58) Field of Classification Search
   CPC .. B60R 21/20; B60R 21/205; B60H 1/00592; B60H 1/00271; B60H 2001/00214
   See application file for complete search history.

(56) References Cited

U.S. PATENT DOCUMENTS

| 5,257,818 A | 11/1993 | Steffens, Jr. |
| 6,378,934 B1 * | 4/2002 | Palazzolo et al. ............. 296/208 |
| 6,464,280 B1 * | 10/2002 | Shibata et al. .................. 296/70 |
| 6,582,011 B2 * | 6/2003 | Palazzolo et al. ............. 296/208 |
| 6,912,863 B2 * | 7/2005 | Tanaka et al. ................... 62/244 |
| 6,988,764 B2 * | 1/2006 | Matsutani ................ 296/193.02 |
| 7,325,827 B2 * | 2/2008 | Reiter ................ B60H 1/00564 |
| | | 280/728.2 |
| 7,731,261 B2 * | 6/2010 | Wenzel et al. .................. 296/70 |
| 2001/0038200 A1 | 11/2001 | Oehm |
| 2003/0001366 A1 * | 1/2003 | Debler ................. B60H 1/0055 |
| | | 280/732 |
| 2004/0094939 A1 | 5/2004 | Debler et al. |
| 2005/0121890 A1 | 6/2005 | Kong |
| 2006/0261581 A1 * | 11/2006 | Kansteiner ............ B60R 21/205 |
| | | 280/732 |

FOREIGN PATENT DOCUMENTS

| DE | 4225709 A1 | 2/1994 |
| DE | 102013213791 A1 | 1/2015 |
| JP | 07228214 A | 8/1995 |
| JP | 09164861 A | 6/1997 |

\* cited by examiner

*Primary Examiner* — Ruth Ilan
*Assistant Examiner* — Joselynn Y Sliteris
(74) *Attorney, Agent, or Firm* — Quinn Law Group, PLLC

(57) ABSTRACT

An integrated airbag and heating, ventilation, and air conditioning (HVAC) assembly includes an airbag module and an HVAC unit. The airbag module includes an airbag housing and an inflatable bladder at least partially disposed in the airbag housing. The inflatable bladder is movable relative to the airbag housing between a stowed position and a deployed position. The HVAC unit includes an HVAC housing. The HVAC housing supports the airbag housing.

15 Claims, 6 Drawing Sheets

INTEGRATED AIRBAG AND HVAC ASSEMBLY

TECHNICAL FIELD

The present disclosure relates to an integrated airbag and heating, ventilation, and air conditioning (HVAC) assembly.

BACKGROUND

Vehicles, such as cars, may include an airbag module and a HVAC unit. The airbag module and HVAC unit may be at least partially covered by an instrument panel assembly. The instrument panel assembly separates a vehicle passenger compartment from some vehicle inner components, such as the airbag module and HVAC unit.

SUMMARY

It is useful to maximize the space in a passenger compartment of a vehicle in order to enhance a passenger's comfort. To do so, the instrument panel may be positioned closer to front wheels of the vehicle. The instrument panel serves as a cover for various inner components, such as the airbag module and the HVAC unit. These inner components occupy space, and it is useful to minimize the space occupied by the inner components covered by the instrument panel in order to place the instrument panel closer to the front wheels and thereby maximize the space in the passenger compartment. In view of the foregoing, it is useful to integrate an HVAC unit with an airbag module in order to be able to place the instrument panel closer to the front wheels of the vehicle in relation to current conventional vehicles.

In an embodiment, an integrated airbag and HVAC assembly includes an airbag module and an HVAC unit. The airbag module includes an airbag housing and an inflatable bladder at least partially disposed in the airbag housing. The inflatable bladder can move (e.g., expand) relative to the airbag housing between a stowed position and a deployed position. The HVAC unit includes an HVAC housing, and the HVAC housing supports the airbag housing.

The present disclosure also relates to vehicles. In an embodiment, the vehicle includes a vehicle body and an instrument panel disposed within the vehicle body. The vehicle further includes an airbag module and an HVAC unit as described above. The HVAC unit and the airbag module are both at least partially covered by the instrument panel. The HVAC housing of the HVAC unit supports the airbag housing of the airbag module.

The above features and advantages and other features and advantages of the present invention are readily apparent from the following detailed description of the best modes for carrying out the invention when taken in connection with the accompanying drawings.

DETAILED DESCRIPTION

Figure 1:
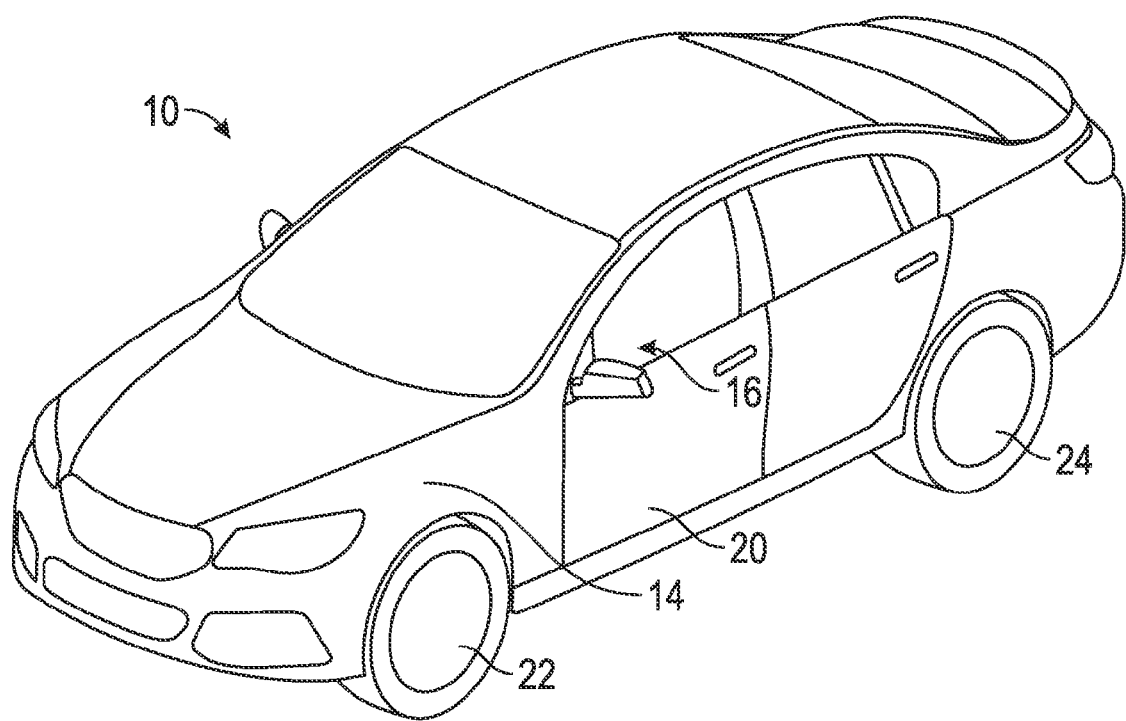
FIG. 1 is a schematic, perspective view of a vehicle.

Referring to the drawings, wherein like reference numbers correspond to like or similar components wherever possible throughout the several figures, FIG. 1 schematically illustrates a vehicle 10, such as a car. The vehicle 10 includes a vehicle body 14 defining a passenger compartment 16. In addition, the vehicle 10 includes at least one door 20 movably coupled to the vehicle body 14. Aside from the door 20, the vehicle 10 includes front wheels 22 and rear wheels 24. The front and rear wheels 22, 24 are operatively coupled to the vehicle body 14.

Figure 2:
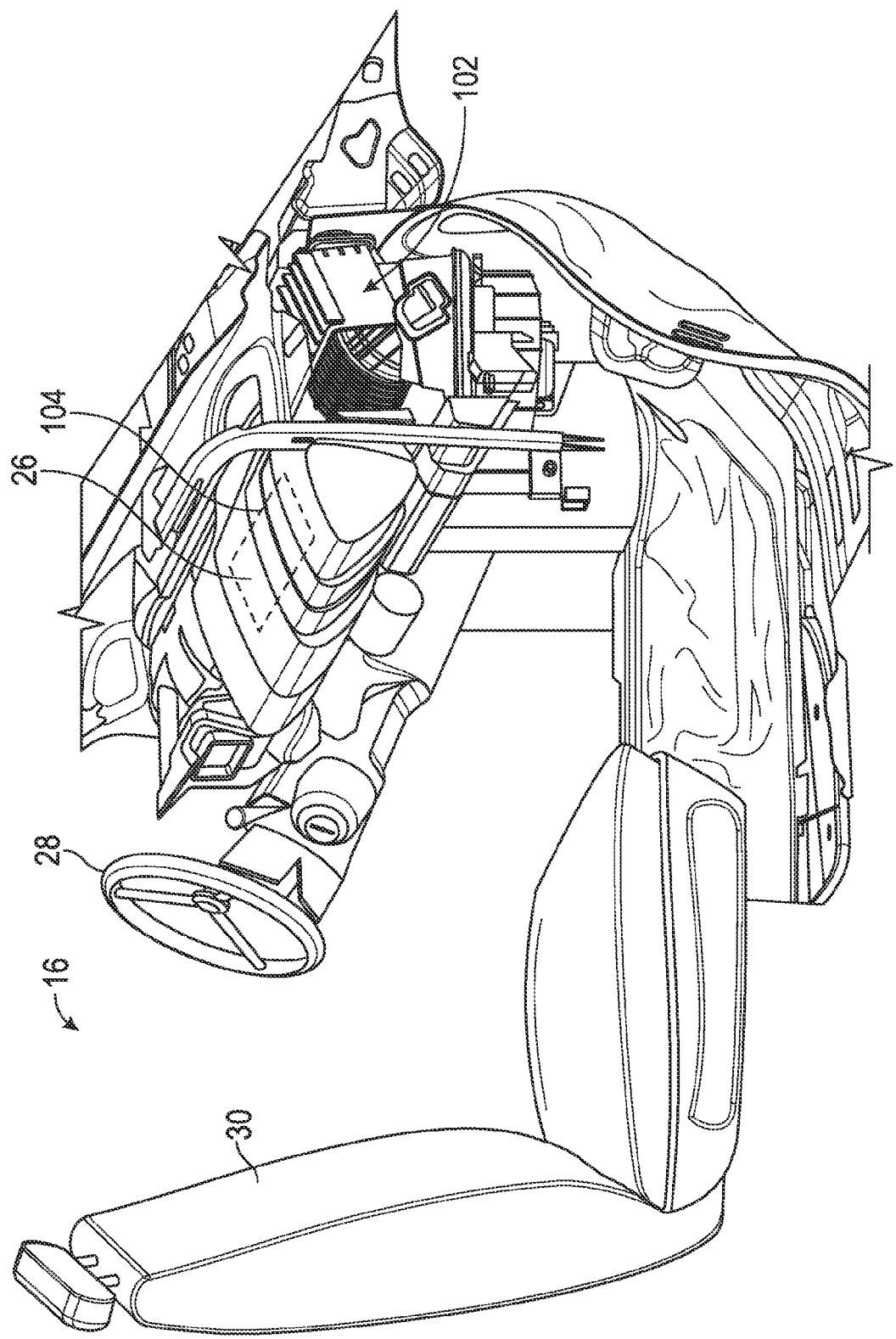
FIG. 2 is a schematic, perspective view of an inner portion of the vehicle, showing a passenger compartment, a steering wheel, an instrument panel assembly, and a seat.

With reference to FIG. 2, the vehicle 10 includes an instrument panel 26 within the vehicle body 14 (FIG. 1). The instrument panel 26 can include various gauges to display information inside the passenger compartment 16. As such, the instrument panel 26 may also be referred to as a dash board.

The vehicle 10 further includes a steering wheel 28 and a seat 30. The steering wheel 28 and seat 30 are both in the passenger compartment 16. The seat 30 may be configured to receive a front seat occupant or co-driver.

The vehicle 10 may further include an HVAC unit 102 at least partially covered by the instrument panel 26. At least one vent (not shown) may be attached to the instrument panel 26. The vents (not shown) are in fluid communication with the HVAC unit 102 and can therefore direct gas (e.g., air, cooled air, heated air) from the HVAC unit 102 into the passenger compartment 16. The HVAC unit 102 can receive outside air at ambient temperature, cool or heat the air, and deliver the air to the passenger compartment 16.

Figure 3:
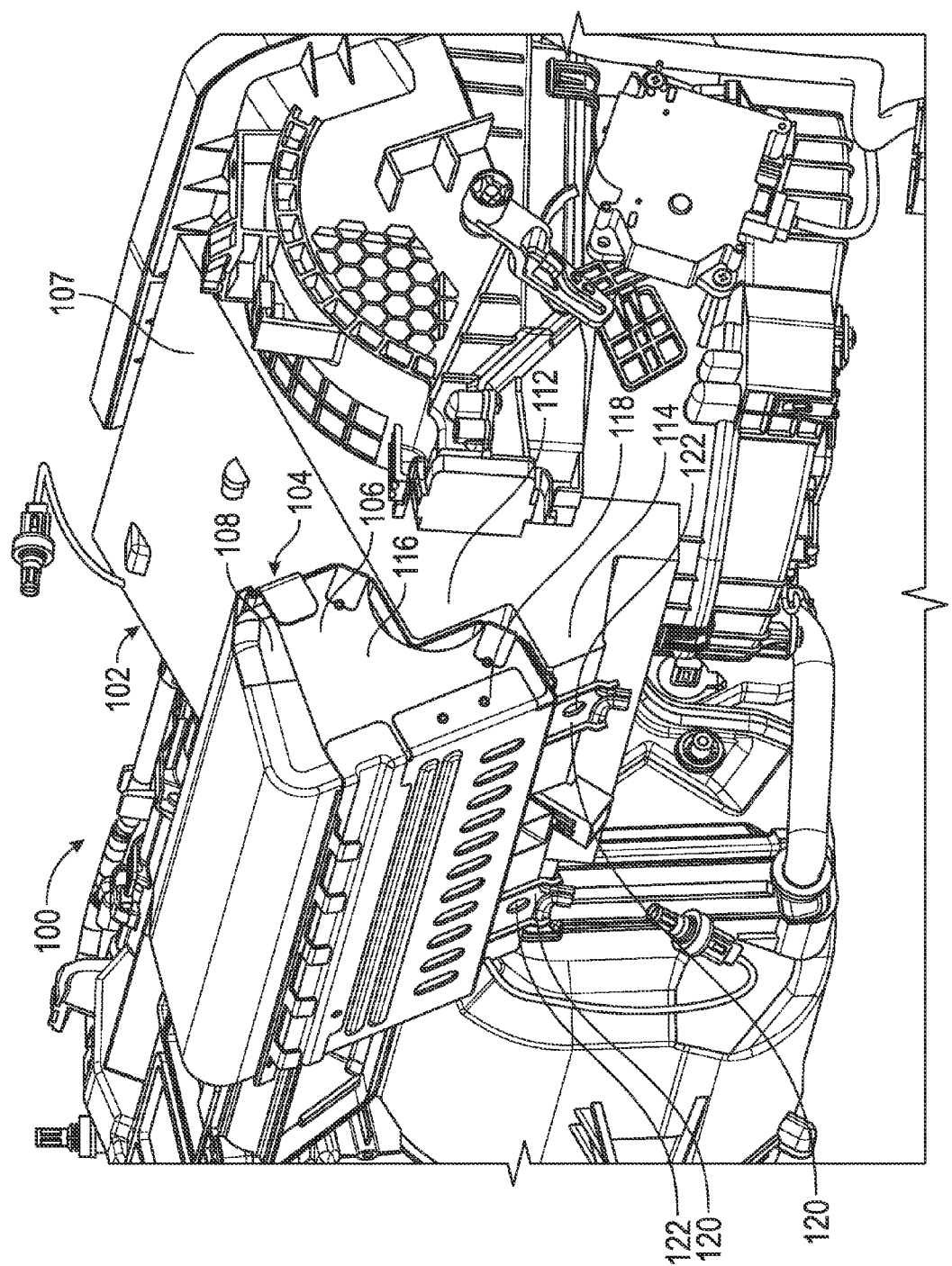
FIG. 3 is a schematic, perspective view of an integrated airbag and HVAC assembly.

With reference to FIG. 3, the vehicle 10 (FIG. 1) further includes an airbag module 104 at least partially covered by the instrument panel 26 (FIG. 2). The airbag module 104 is directly supported by the HVAC unit 102 so as to define an assembly 100. Further, the airbag module 104 is disposed adjacent the instrument panel 26 (FIG. 3) so as to maximize space in the passenger compartment 16 (FIG. 2). The assembly 100 may be referred to as the integrated airbag and HVAC assembly 100 or AHVAC assembly. The HVAC unit 102 includes an HVAC housing 107, and the airbag module 104 may be directly supported by the HVAC housing 107. In the depicted embodiment, the HVAC housing 107 supports the airbag housing 106. The airbag module 104 includes an airbag housing 106 and an inflatable bladder 108 at least partially disposed in the airbag housing 106. The inflatable bladder 108 can move (e.g., expand) relative to the airbag housing 106 from a stowed position (i.e., deflated state) to a deployed position (i.e., inflated state). In the stowed position, most of the inflatable bladder 108 is disposed inside the airbag housing 106. Conversely, in the deployed position, most of the inflatable bladder 108 is outside the airbag housing 106. Moreover, the airbag module 104 includes an inflator (not shown) operatively coupled to the inflatable bladder 108. Upon actuation, the inflator (not shown) inflates the inflatable bladder 108, thereby moving the inflatable bladder 108 from the stowed position to the deployed position.

With continued reference to FIG. 3, the HVAC housing 107 directly supports the airbag housing 106 and therefore absorbs the reaction force exerted by the airbag housing 106 in response to the deployment of the inflatable bladder 108. Accordingly, the HVAC housing 107 is wholly or partly made of a substantially rigid material, such as a rigid polymer. As non-limiting examples, the HVAC housing 107 may be wholly or partly made of polypropylene (PP), thermoplastic olefin (TPO), glass filled or long glass filled polypropylene, glass filled nylon, glass filled TPO, carbon fiber reinforced polymers (CFRP), polycarbonate blended materials (e.g., polycarbonate—acrylonitrile butadiene styrene, polycarbonate—polyethylene terephthalate, polycarbonate—polybutylene terephthalate), or a combination thereof.

The HVAC housing 107 may include a main HVAC housing body 112 and HVAC housing flange 114 extending outwardly from the main HVAC housing body 112. The airbag housing 106 includes a main airbag housing body 116 and an airbag housing protrusion 118 extending downwardly from the main airbag housing body 116. The main airbag housing body 116 rests on the main HVAC housing body 112, and the airbag housing protrusion 118 rests on the HVAC housing flange 114. Accordingly, the main HVAC housing body 112 directly supports (and is in contact with) the main airbag housing body 116, and the HVAC housing flange 114 directly supports (and is in contact with) the airbag housing protrusion 118.

The airbag housing 106 may further include at least one plate 120 extending from the airbag housing protrusion 118. In the depicted embodiment, airbag housing 106 includes two plates 120. Regardless of the quantity, each plate 120 defines a plate hole 122 configured, shaped, and sized to receive a fastener (not shown) such as a screw or bolt. A fastener (not shown) can be inserted through each plate hole 122 to couple the airbag housing 106 to the HVAC housing 107. Therefore, the airbag housing 106 is directly coupled to the HVAC housing 107.

Figure 4:
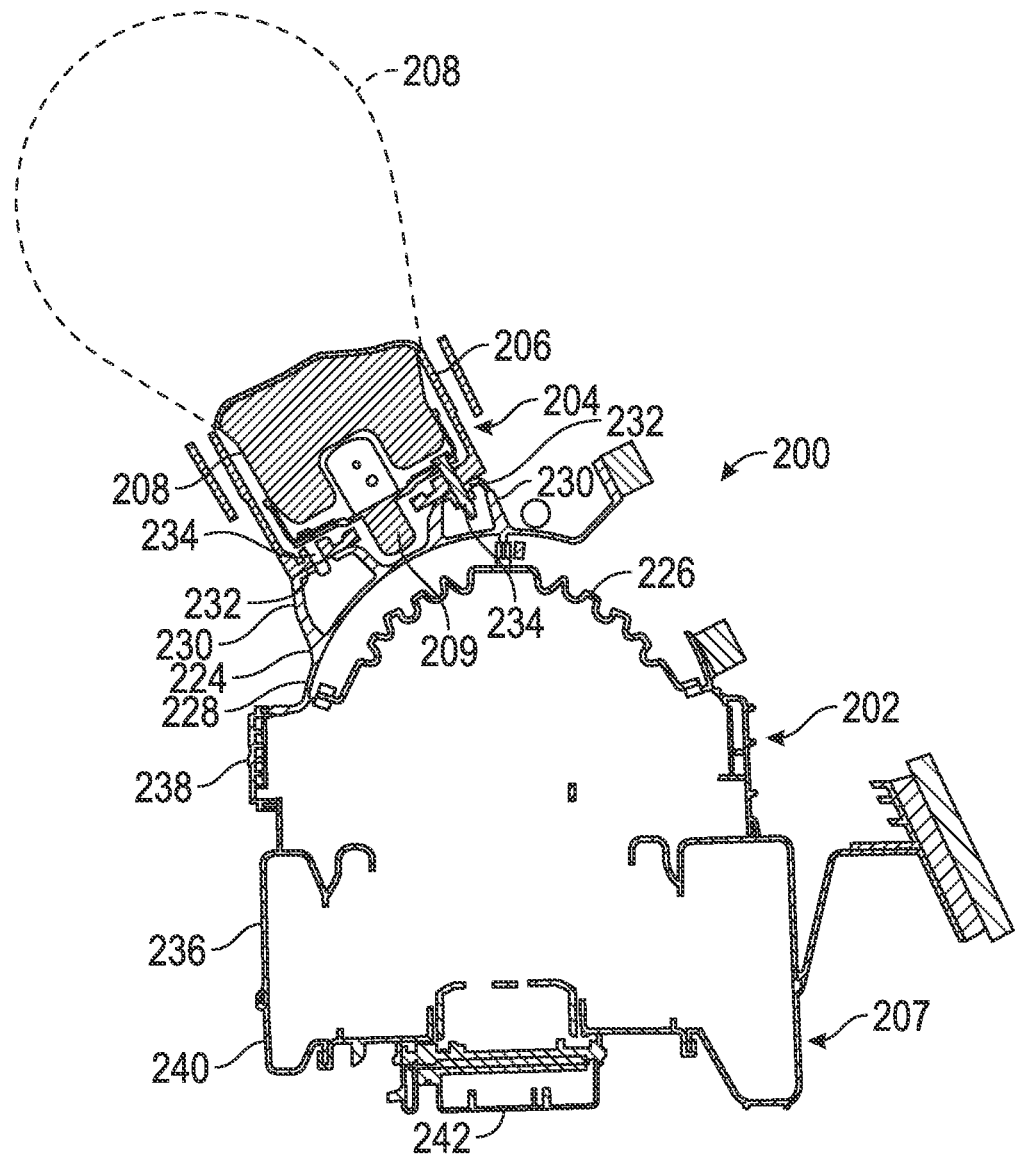
FIG. 4 is a schematic, cross-sectional view of an integrated airbag and HVAC assembly in accordance with an embodiment of the present disclosure.

FIG. 4 schematically illustrates an airbag and HVAC assembly 200 in accordance with another embodiment of the present disclosure. The assembly 200 is substantially similar to the assembly 100 described above, except for the features described below. In the depicted embodiment, the assembly 200 includes an HVAC unit 202 and an airbag module 204 directly supported by the HVAC unit 202. The airbag module 204 includes an airbag housing 206 and an inflatable bladder 208 at least partially disposed inside the airbag housing 206. Moreover, the airbag module 204 includes an inflator 209 operatively coupled to the inflatable bladder 208. Upon actuation, the inflator 209 inflates the inflatable bladder 208, thereby moving the inflatable bladder 208 from the stowed position to the deployed position (shown in dashed lines).

The HVAC housing 207 includes a first housing segment 224. The first housing segment 224 may be an air inlet case and, accordingly, houses an air inlet valve 226. In other words, the HVAC unit 202 includes the air inlet valve 226, and the air inlet valve 226 may be at least partially disposed within the first housing segment 224. The air inlet valve 226 selectively controls airflow into the HVAC unit 202. The first housing segment 224 includes a first housing segment body 228 (or first segment body) and at least one bracket 230 extending from the first housing segment body 228. In the depicted embodiment, the first housing segment 224 includes two brackets 230. Each bracket 230 defines a bracket hole 232 configured, shaped, and sized to receive a fastener 234. The fastener 234 may be a bolt, screw, or stud, and can extend through the brackets 230 and the first housing segment 224, thereby directly coupling the first housing segment 224 to the airbag housing 206. In other words, the airbag housing 206 is directly coupled to the first housing segment 224. At least one fastener 234 can directly couple the first housing segment 224 to the airbag housing 206.

In addition to the first housing segment 224, the HVAC unit 202 further includes a second housing segment 240 and a third housing segment 236 interconnecting the first and second housing segments 224, 240. The third housing segment 236 may be an upper blower case, and the second housing segment 240 may be a lower blower case. The third housing segment 236 and an air filter cover 238 are disposed between the first housing segment 224 and the second housing segment 240. The second housing segment 240 is directly coupled to the third housing segment 236. Further, the second housing segment 240 is directly coupled to a blower motor assembly 242. The HVAC unit 202 includes the blower motor assembly 242, which can blow gas (e.g., air) into the passenger compartment 16 (FIG. 1).

Figure 5:
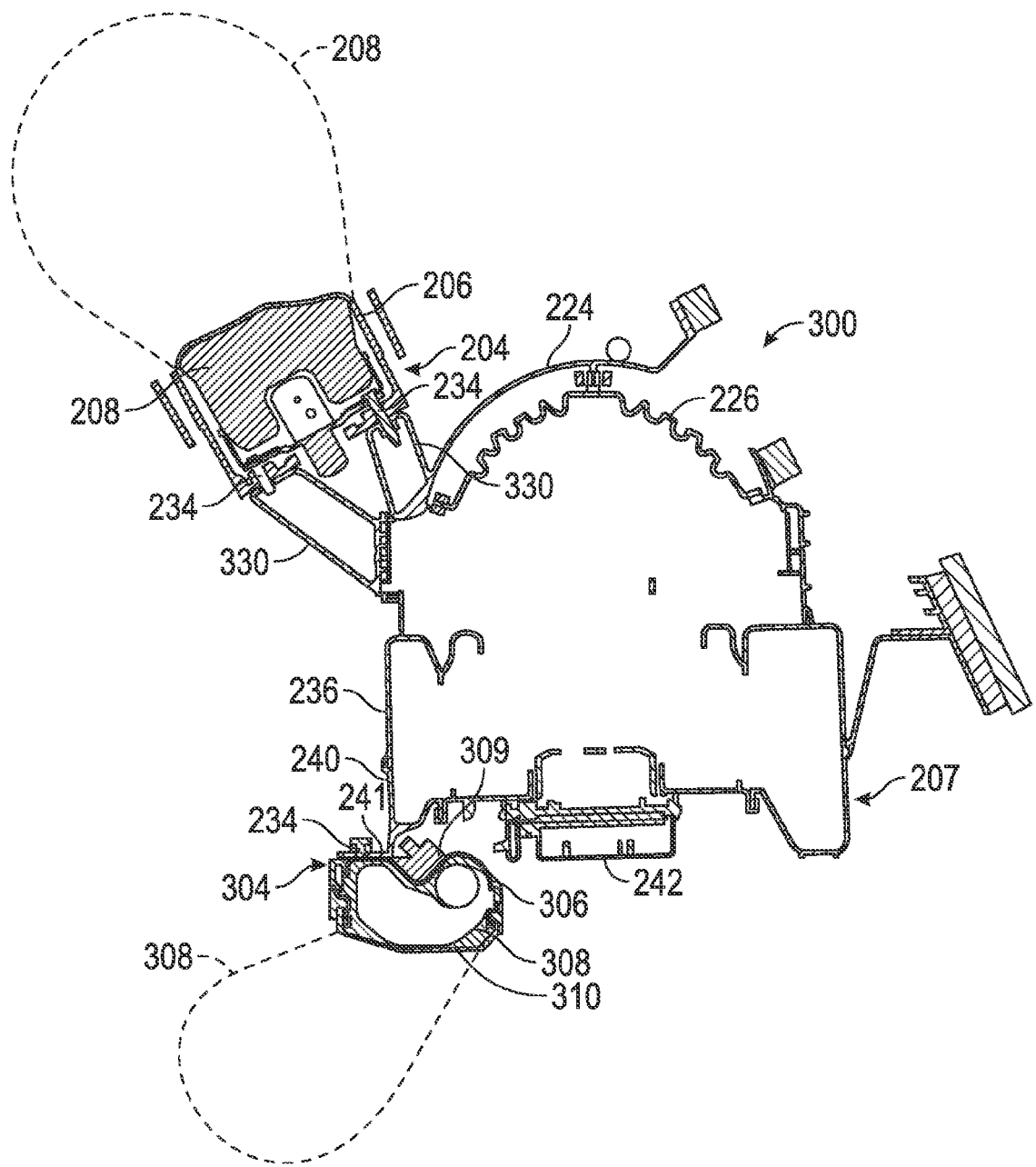
FIG. 5 is a schematic, cross-sectional view of an integrated airbag and HVAC assembly in accordance with another embodiment of the present disclosure.

FIG. 5 schematically illustrates another embodiment of an airbag and HVAC assembly 300 in accordance with another embodiment of the present disclosure. The assembly 300 is similar to the assembly 200 described above, except for the features described below. In the depicted embodiment, the assembly 300 includes brackets 330 that are longer than the brackets 230 (FIG. 4) and are positioned closer to a front portion of the assembly 300.

In addition to the brackets 330, the assembly 300 includes a second or lower airbag module 304. Accordingly, the airbag module 204 may be referred to as the first or upper airbag module, and the airbag housing 206 may be referred to as the first or upper airbag housing 206. The second airbag module 304 may be referred to as the knee airbag module 304. Further, the second airbag module 304 may be similar to the first airbag module 204; however, the second airbag module 304 is directly coupled to, and supported by, the second housing segment 240. In the depicted embodiment, the second airbag module 304 includes a second airbag housing 306 and a second inflatable bladder 308 at least partially disposed inside the second airbag housing 306. The second airbag housing 306 is supported by the HVAC housing 207. The second housing segment 240 may include a housing flange 241. At least one fastener 234, such as a bolt, screw, or stud, may be inserted through the housing flange 241 and the second airbag housing 306 in order to couple the second airbag module 304 to the second housing segment 240. Thus, at least one fastener 234 may directly couple the second airbag housing 306 to the second housing segment 240. Moreover, the second airbag module 304 includes a second inflator 309 operatively coupled to the second inflatable bladder 308. Accordingly, the inflator 209 may be referred to as the first inflator. Upon actuation, the second inflator 309 inflates the second inflatable bladder 308, thereby moving the second inflatable bladder 308 from the stowed position to the deployed position (shown in dashed lines). The second airbag module 304 further includes a cover or deployment door 310 temporarily attached to the second airbag housing 306. The second inflatable bladder 308 brakes via a tear seam or initiator when the second inflatable bladder 308 is inflated.

Figure 6:
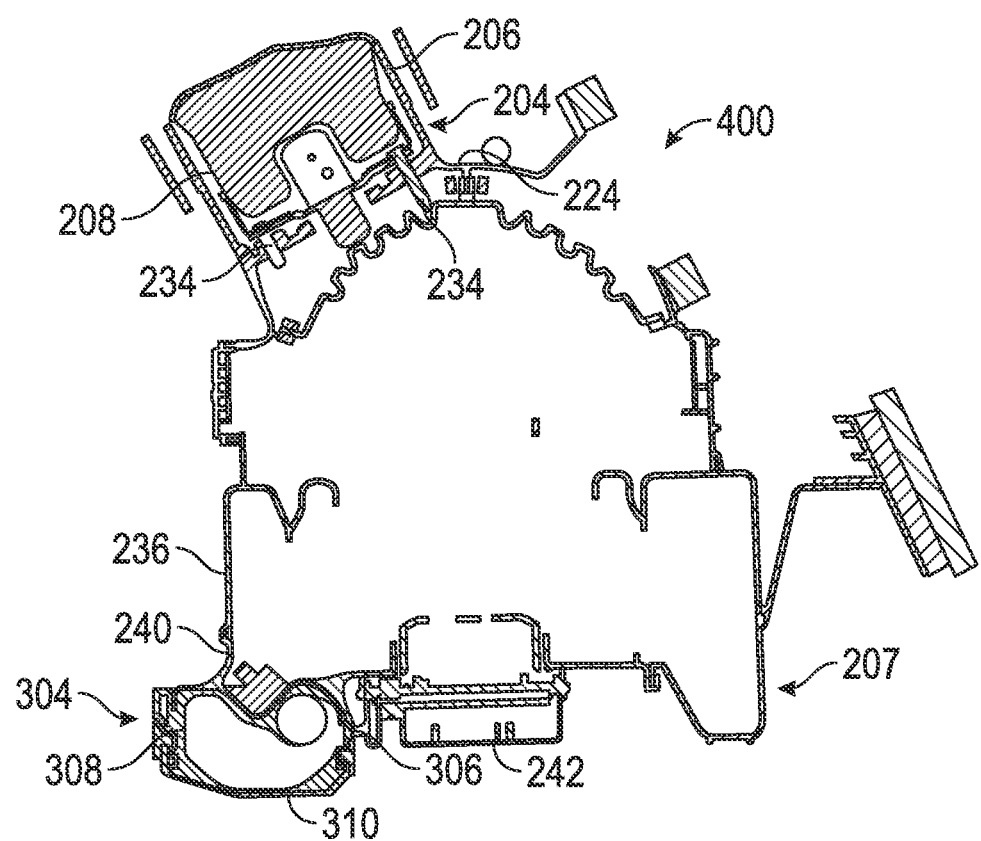
FIG. 6 is a schematic, cross-sectional view of an integrated airbag and HVAC assembly in accordance with another embodiment of the present disclosure.

FIG. 6 schematically illustrates an airbag and HVAC assembly 400 in accordance with another embodiment of the present disclosure. The assembly 400 is similar to the assembly 300 described above, except for the features described below. The assembly 400 includes the first and second airbag housings 206, 306 that are integrally coupled to the HVAC housing 207. Specifically, the first housing segment 224 is integrally coupled to the first airbag housing 206 so as to form a one-piece structure, and the second housing segment 240 is integrally coupled to the second airbag housing 306 so as to form a one-piece structure. As non-limiting examples, the first housing segment 224 may be molded with the first airbag housing 206 so as to form a one-piece structure, and the second airbag housing 306 may be molded with the second housing segment 240 so as to form a one-piece structure. At least one fastener 234 may be used to enhance the connection between the first airbag housing 206 and the first housing segment 224.

While the best modes for carrying out the invention have been described in detail, those familiar with the art to which this invention relates will recognize various alternative designs and embodiments for practicing the invention within the scope of the appended claims.

The invention claimed is:

1. An integrated airbag and heating, ventilation, and air conditioning (HVAC) assembly, the assembly comprising:
a first airbag module including a first airbag housing and a first inflatable bladder at least partially disposed in the first airbag housing, the first inflatable bladder being movable relative to the first airbag housing between a stowed position and a deployed position;
a second airbag module including a second airbag housing and a second inflatable bladder at least partially disposed inside the second airbag housing, the second inflatable bladder being movable relative to the second airbag housing; and
a HVAC unit including an HVAC housing, wherein the HVAC housing directly interconnects the first airbag housing and the second airbag housing such that the first airbag housing and the second airbag housing are directly coupled to the HVAC housing.

2. The assembly of claim 1, wherein the HVAC housing includes a first housing segment, a second housing segment and a third housing segment directly interconnecting the first and second housing segments, the air inlet valve is disposed closer to the the first housing segment is closer to the first airbag housing than to the second airbag housing, and the second airbag housing is closer to the second housing segment than to the first housing segment.

3. The assembly of claim 2, further comprising at least one fastener directly coupling the first housing segment to the first airbag housing, wherein the at least one fastener extends only through the first housing segment and the first airbag housing.

4. The assembly of claim 3, wherein the first housing segment is integrally coupled to the first airbag housing so as to form a first one-piece structure, and the second housing segment is integrally coupled to the second airbag housing to form a second one-piece structure.

5. The assembly of claim 4, wherein the HVAC unit includes a blower motor assembly, wherein the blower motor assembly is disposed closer to the second housing segment than to the first housing segment.

6. The assembly of claim 5, wherein the second housing segment is directly coupled to the blower motor assembly and the blower motor assembly is closer to the second airbag module than to the first airbag module.

7. The assembly of claim 6, wherein the HVAC unit includes an air filter cover disposed between the first housing segment and the second housing segment.

8. The assembly of claim 7, wherein the third housing segment is entirely disposed between the first housing segment and the second housing segment, and the third housing segment is directly coupled to the second housing segment.

9. A vehicle, comprising:
a vehicle body defining a passenger compartment;
an instrument panel disposed within the vehicle body;
a first airbag module at least partially covered by the instrument panel, the first airbag module including a first airbag housing and a first inflatable bladder at least partially disposed in the first airbag module, the first inflatable bladder being movable relative to the first airbag housing between a stowed position and a deployed position;
a second airbag module including a second airbag housing and a second inflatable bladder at least partially disposed in the second airbag module, the second inflatable bladder being movable relative to the second airbag housing; and
a heating, ventilation, and air conditioning (HVAC) unit at least partially covered by the instrument panel, the HVAC unit including an HVAC housing, wherein the HVAC housing supports the first and second airbag housings, and the HVAC housing directly interconnects the first airbag housing and the second airbag housing such that the first airbag housing and the second airbag housing are directly coupled to the HVAC housing.

10. The vehicle of claim 9, wherein the HVAC housing includes a first housing segment, a second housing segment and a third housing segment directly interconnecting the first and second housing segments, the HVAC unit includes an air inlet valve disposed within the first housing segment, the first housing segment is closer to the first airbag housing than to the second airbag housing, and the second airbag housing is closer to the second housing segment than to the first housing segment.

11. The vehicle of claim 10, further comprising at least one fastener directly coupling the first housing segment to the first airbag housing, wherein the at least one fastener extends only through the first housing segment and the first airbag housing.

12. The vehicle of claim 11, the HVAC unit includes a blower motor assembly that is closer to the second airbag module than to the first airbag module.

13. The vehicle of claim 12, wherein the HVAC unit includes an air filter cover disposed between the first housing segment and the second housing segment, the third housing segment is entirely disposed between the first housing segment and the second housing segment.

14. The vehicle of claim 10, wherein the HVAC housing directly interconnects the first airbag housing and the second airbag housing.

15. The vehicle of claim 14, wherein the HVAC unit includes a blower motor assembly, wherein the blower motor assembly is disposed closer to the second housing segment than to the first housing segment.

* * * * *